Dec. 5, 1961  R. BINDER  3,011,357
CLUTCH-CONTROLLED AUTOMATIC GEAR SHIFTING MECHANISM
Filed Feb. 7, 1956  2 Sheets-Sheet 1

INVENTOR:
RICHARD BINDER
BY
Richardson, David and Nordon
HIS ATTYS.

Dec. 5, 1961 R. BINDER 3,011,357
CLUTCH-CONTROLLED AUTOMATIC GEAR SHIFTING MECHANISM
Filed Feb. 7, 1956 2 Sheets-Sheet 2

INVENTOR:
RICHARD BINDER
By
Richardson, David and Nordon
HIS ATTY'S.

United States Patent Office 3,011,357
Patented Dec. 5, 1961

3,011,357
CLUTCH-CONTROLLED AUTOMATIC GEAR
SHIFTING MECHANISM
Richard Binder, Schweinfurt (Main), Germany, assignor to Fichtel & Sachs A.G., Schweinfurt (Main), Germany, a corporation of Germany
Filed Feb. 7, 1956, Ser. No. 563,970
Claims priority, application Germany Feb. 10, 1955
5 Claims. (Cl. 74—334)

The present invention relates to a novel connection between the gear shifting and clutch actuating mechanisms of an automotive vehicle.

It is known to effect the engagement and disengagement of a clutch by means of fluid pressure operated servomotors actuated by vacuum, compressed air or oil under pressure in which connection the flow of the pressure medium is controlled by means of a valve, and generally an electrically controlled valve. It is also known to effect the shifting of the gears by power operated means such as vacuum, compressed air, or oil pressure operated devices or by means such as an electric motor. In these prior art arrangements, however, it is necessary that the clutch be first disengaged before any attempt is made to shift the gears since if the gear shift lever is attempted to be operated without use of the clutch, the gear teeth may be damaged. Similarly, the gear teeth may be damaged if the clutch is permitted to engage before the gear shifting operation has been completed, i.e., while the gear shift lever is moving through an intermediate position between two adjacent positions corresponding to two different gear ratios.

It is therefore an object of the present invention to provide a heavy duty power operated clutch and gear shift combination wherein the gears cannot be shifted while the clutch is engaged.

It is another object of the invention to provide such a combination wherein the clutch, when disengaged, cannot become reengaged before the gear shifting operation has been completed.

In accordance with the present invention the clutch control means and the gear shifting means are interconnected with each other so that shifting of the gears can only take place after the clutch has become disengaged and re-engagement of the clutch is not possible until after the gear shifting operation has been completed. In a preferred embodiment, the re-engagement of the clutch is effected automatically upon completion of the gear shifting operation.

The invention will now be described more fully with reference to the accompanying drawings, wherein.

Figure 1:
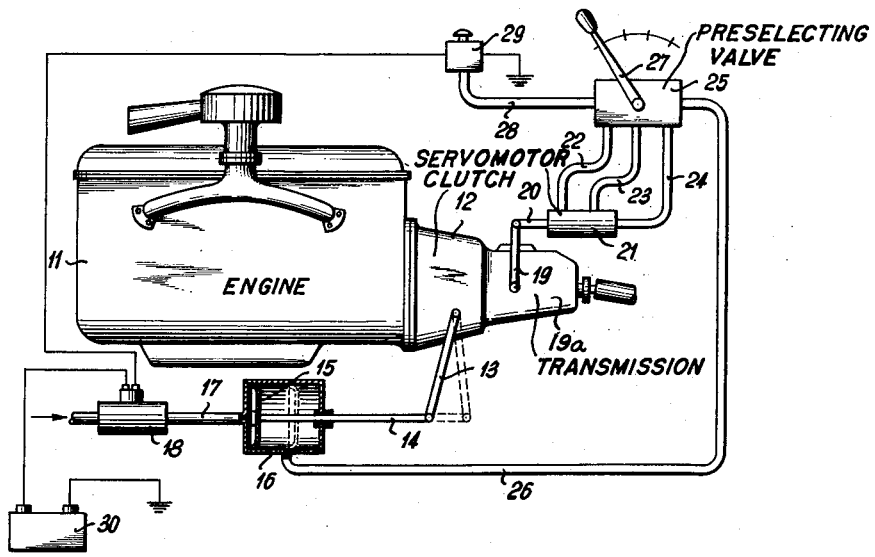
FIGURE 1 is a diagram showing the operating connections between certain clutch control and gear shifting members, in accordance with the present invention.

Referring now more particularly to the drawings, in FIG. 1 there is shown the engine 11 of an automobile (not shown). The engine 11 is connected to a clutch housing 12 into which extends a lever 13, controlling engagement and disengagement of the clutch. The other end of the lever 13 is connected to a piston rod 14 carrying a piston head 15 which is disposed within a servomotor cylinder 16. A pressure fluid line 17 leading from a supply of pressure fluid, e.g., compressed air, to the cylinder 16 is controlled by an electrically operated valve 18.

A transmission 19a is shown provided with a gear shifting lever 19 which is connected with a single piston rod 20 extending into a single servomotor cylinder 21, although in practice, these parts may be multiplied. Fluid lines 22, 23, 24 extend from cylinder or cylinders 21 to gear ratio pre-selecting valve 25, pressure fluid travelling to valve 25 from cylinder 16 by means of a conduit or pipeline 26. The preselecting valve 25 is controlled by a manual shift lever 27 which determines to which of lines 22, 23, 24 the pressure fluid is to be supplied and hence the ratio to be selected within the transmission 19a. A further conduit 28 extends from valve 25 to an electric push-button switch 29 receiving its electric energy from battery 30 which also controls electrically operated valve 18.

The apparatus of FIG. 1 operates as follows:

The manually operated lever 27 on the distributor valve 25 can be moved as desired, even when the vehicle is in gear and moving with the clutch engaged. In spite of movement of the lever 27 no shifting of gears is effected so long as the clutch is engaged so that the lever 27 can be placed in any desired preselected position corresponding to the gear ratio which is eventually desired. Following this pre-selection of the gear ratio, the push-button switch 29 is depressed, thereby closing the circuit controlling valve 18 and opening this valve so as to permit pressure fluid to flow through line 17 into cylinder 16. The pressure fluid displaces piston head 15 and the piston rod 14 pivots lever 13 to disengage the clutch, the end positions of the piston and clutch lever being shown in broken lines. As the disengagement of the clutch is being completed, the piston head 15 exposes pipeline 26 to the fluid within cylinder 16 and the pressure is transmitted through valve 25 to servomotor cylinder or cylinders 21. The disposition of the manually operated lever 27 will determine through which of lines 22, 23, 24 the fluid flows to the cylinder or cylinders 21 and will thus determine the displacement of piston rod 20 and the gear ratio which is engaged. The clutch can then be re-engaged either by hand or by foot by releasing the pushbutton switch 29. However, according to a preferred embodiment of the invention this re-engagement is effected automatically upon completion of the gear shifting when the piston rod 20 has reached its final position for the gear ratio desired. Such an automatically operating arrangement will be described more fully hereinafter with reference to FIG. 4.

Figure 2:
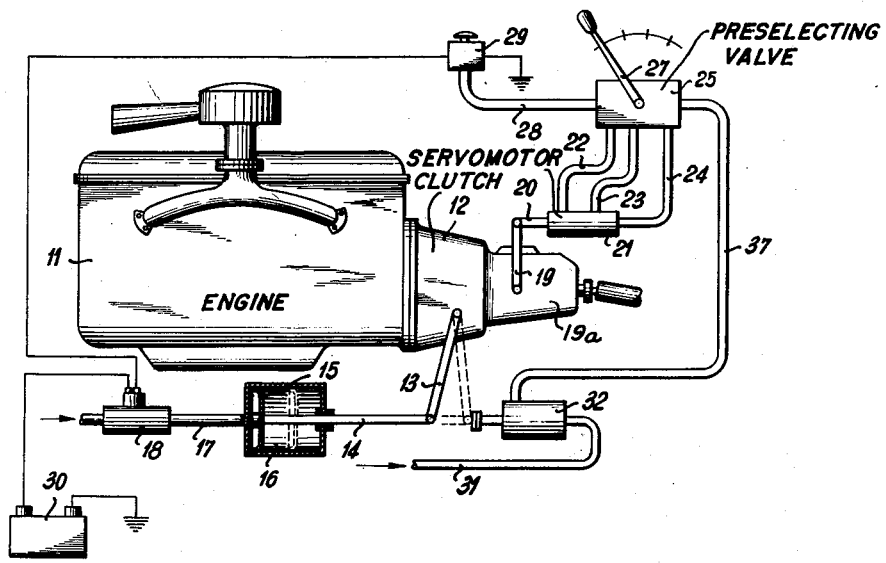
FIGURE 2 is a schematic view of a modified embodiment wherein the clutch is automatically re-engaged after completion of the gear shifting operation.
Figure 3:
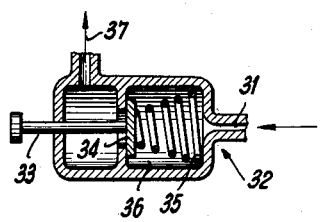
FIGURE 3 is a sectional view in elevation of a gear shift control valve shown schematically in FIG. 2.

In FIG. 2 there is shown a similar arrangement with the difference however that the pressure medium for the cylinder or cylinders 21 for the shifting of the gears is not fed via the servomotor 16 for the clutch but separately via the pipe 31 and the shut-off valve 32, the inner construction of which is shown by way of example in FIG. 3. This shut-off valve consists of a valve stem 33 carrying a valve plate 34 which is pressed by a spring 35 against its seat in the housing 36. The feeding of the pressure medium takes place through the pipeline 31 so that therefore the closed valve plate 34 is additionally pressed against its seat by the pressure medium. The connection of this shut-off valve 32 with the servomotor or servomotors 21 is effected via the pipeline 37. The shut-off valve 32 is so arranged that upon disengagement of the clutch the valve stem 33 is forced into the housing 36 against the action of spring 35 by the lever 13 when the disengaged position is reached or shortly prior to same, as a result of which the valve plate 34 is raised and the pressure agent can then flow to the servomotor or servomotors 21 for the shifting of the gears. After the gears have been shifted, the valve is again closed upon initiation of the engagement of the clutch.

Figure 4:
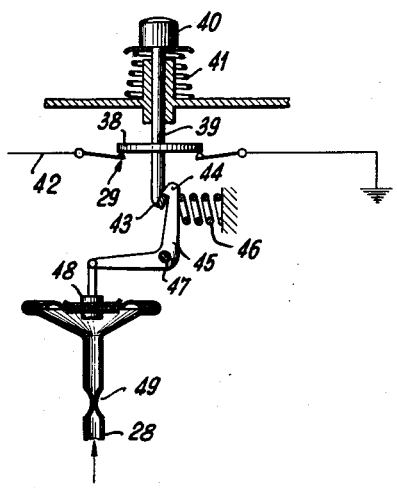
FIGURE 4 is a diagrammatic representation of a push-button type control switch shown schematically in FIGS. 1 and 2, the switch being provided with a fluid pressure operated latch for controlling automatic re-engagement of the clutch following shifting of the gears.

In FIG. 4 there is diagrammatically shown an embodiment of the switch 29 in clutch disengaging position. By means of this switch the circuit to a solenoid (not shown) actuating the valve 18 is closed, namely via the contact bridge member 38 which is fastened to the stem 39 rigidly connected with the pushbutton 40. The spring 41 urges the button 40 to a position (not shown) in which the contact bridge member 38 would no longer touch the contact 42 to thereby open the switch.

The stem 39 is provided at its end with a hook 43 which engages with a corresponding mating hook 44 of a bell-crank 45 which is urged by the spring 46 to pivot counterclockwise about its pivot 47. This bell-crank 45 is connected with a diaphragm 48 which is acted on by the pressure medium supplied through line 28 (FIG. 1). The spring 46 is so dimensioned that it is only overcome when the pressure medium acting on the diaphragm 48 has reached a given pressure. For the actuation of the servomotor or servomotors 21 in the shifting of the gears, a given pressure, for instance 2 atmospheres gauge, is necessary. The normal pressure produced by the pump is however higher, for instance 4 atmospheres gauge. At the moment when the piston rod 20 of the operating servomotor reaches its end position in cylinder 21, the pressure of the pressure medium will rise up to the maximum value of 4 atmospheres gauge. The spring 46 should therefore be of such a nature that it can be overcome only at a pressure which is higher than the pressure necessary for the actuation of the servomotor or servomotors 21, for instance at a pressure of about 3 atmospheres gauge. Therefore as soon as the piston rod of the operating servomotor 21 has reached its end position and the pressure in the servomotor and in the pipelines has thus increased, the pressure of spring 46 is overcome, crank 45 pivots about post 47, hooks 43 and 44 disengage, stem 39 is raised by the urging of spring 41, and the contact member 38 is separated from contact 42. As a result valve 18 closes, servomotor 16 is vented, piston head 15 and rod 14 are moved by lever 13 to their initial positions and the clutch is re-engaged.

It is noted that the line 28 leading to the diaphragm 48 is provided with a restriction or throttle 49 which results in a certain delaying action so that re-engagement of the clutch will not take place until after shifting of the gears has been completed. The throttle also prevents accidental release of the switch during shifting due to temporary pressure increases resulting from surging of the pressure medium.

The operative connection between the clutch-disengaging and gear-shifting mechanisms in accordance with the present invention is especially suited for heavy vehicles such as buses and trucks. It can be used to advantage with a hydrodynamic clutch having a mechanical clutch connected behind it as well as with disengageable centrifugal clutches.

Various changes and modifications may be made without departing from the spirit and scope of the present invention and it is intended that such obvious changes and modifications be embraced by the annexed claims.

What I claim is:

1. In a driving mechanism including a transmission for rotating a driven shaft selectively at one of several gear ratios, a clutch drivingly connected to said transmission, and means for disengaging said clutch to thereby free said driven shaft prior to being driven at another gear ratio; the combination of manually operable means for pre-selecting the gear ratio, means for initiating disengagement of said clutch, gear shifting means for shifting gears within said transmission to change the gear ratio thereof, fluid pressure operable servomotor means connected to said gear ratio pre-selecting means and to said gear shifting means for causing said transmission to operate at the particular gear ratio selected by said pre-selecting means, conduit means adapted for connection to a source of pressure fluid and in communication with said servomotor means to effect said gear shifting, valve means controlled by said clutch disengaging means normally closing off said conduit means from said servomotor means to prevent gear shifting with said clutch engaged, and fluid pressure releasable latching means included in said manually operable means and connected to said servomotor means, said latching means holding said manually operable means in its actuated position to maintain said clutch disengaged until after completion of gear shifting by said servomotor means.

2. In a driving mechanism including a transmission for rotating a driven shaft selectively at one of several gear ratios, a clutch drivingly connected to said transmission, and means for disengaging said clutch to thereby free said driven shaft prior to being driven at another gear ratio; the combination of means for preselecting the gear ratio, means for initiating disengagement of said clutch, gear shifting means for shifting gears within said transmission to change the gear ratio thereof, fluid pressure operable servomotor means connected to said gear ratio pre-selecting means and to said gear shifting means for causing said transmission to operate at the particular gear ratio selected by said pre-selecting means, conduit means adapted for connection to a source of pressure fluid in communication with said servomotor means, valve means normally closing off said conduit means from said servomotor means to prevent gear shifting, said valve means being operatively connected with said clutch disengaging means so that said valve means is opened only when said clutch has been effectively disengaged, whereby shifting of said gears in accordance with said pre-selection is initiated only after said clutch has been disengaged, further conduit means operatively connected with said first-named conduit means and with said clutch disengaging initiating means, hook means retaining said clutch disengaging initiating means in operative position upon actuation, and diaphragm means operatively connected with said further conduit means and with said hook means, said diaphragm means being operable in response to an increase in fluid pressure within said further conduit means above a predetermined level in excess of the pressure necessary to effect shifting of the gears by said servomotor means, displacement of said diaphragm serving to displace hook means and thereby release said clutch disengaging initiating means to permit re-engagement of the clutch.

3. The combination as defined in claim 2, including flow restricting means serially included in said further conduit means, whereby a time delay is provided prior to re-engagement of said clutch so that temporary pressure pulsations will not accidentally actuate said diaphragm means to effect premature re-engagement of the clutch.

4. A driving mechanism including a transmission for rotating a driven shaft selectively at a predetermined one of several gear ratios, selective valve means for preselecting a particular gear ratio, pressure fluid operable gear shifting means connected to said transmission for changing the gear ratio thereof, a clutch connected to said transmission for unloading said transmission during operation of said gear shifting means, fluid pressure operable clutch actuating means connected to said clutch for disengaging said clutch to unload said transmission, conduit means adapted to be connected to a source of pressure fluid, said conduit means extending to said gear shifting means through said selective valve means and extending from said source of pressure fluid to said clutch actuating means, electrically controlled valve means included in said conduit means for controlling the flow of pressure fluid to said clutch actuating means, fluid flow control means included in said conduit means and responsive to actuation of said clutch actuating means for preventing the flow of pressure fluid to said gear shifting means during engagement of said clutch, an energizing circuit for said valve means, push button means for controlling said valve means, and fluid pressure operated latching means included in said push button means, said latching means being connected to said selective valve means for operation along with said gear shifting means, said latching means holding said push button means in its operated position to cause operation of said clutch actuating means until the fluid pressure applied to said latching means exceeds the pressure required for operation of said gear shifting means.

5. A mechanism according to claim 4, further comprising flow restricting means included in the connection from said latching means to said selective valve means, said flow restricting means retarding operation of said latching means and reducing the sensitivity of said latching means to transient fluctuations in the pressure of said pressure fluid at said selective valve means.

References Cited in the file of this patent

UNITED STATES PATENTS

| | | |
|---|---|---|
| 1,805,120 | Von Erhardt | May 12, 1931 |
| 2,185,730 | Griswold | Jan. 2, 1940 |
| 2,189,681 | Sanford et al. | Feb. 6, 1940 |
| 2,226,205 | Linsley | Dec. 24, 1940 |
| 2,233,790 | Linsley | Mar. 4, 1941 |
| 2,318,258 | Porter | May 4, 1943 |
| 2,758,686 | Rabe | Aug. 14, 1956 |